United States Patent
Cady

(10) Patent No.: US 11,546,420 B2
(45) Date of Patent: Jan. 3, 2023

(54) QUALITY OF SERVICE (QOS) SETTINGS OF VOLUMES IN A DISTRIBUTED STORAGE SYSTEM

(71) Applicant: NetApp, Inc., Sunnyvale, CA (US)

(72) Inventor: Tyler Cady, Denver, CO (US)

(73) Assignee: NETAPP, INC., San Jose, CA (US)

(*) Notice: Subject to any disclaimer, the term of this patent is extended or adjusted under 35 U.S.C. 154(b) by 160 days.

(21) Appl. No.: 16/799,602

(22) Filed: Feb. 24, 2020

(65) Prior Publication Data
US 2021/0266358 A1    Aug. 26, 2021

(51) Int. Cl.
*H04L 67/1012* (2022.01)
*G06N 3/08* (2006.01)
*H04L 67/1097* (2022.01)

(52) U.S. Cl.
CPC ........... *H04L 67/1012* (2013.01); *G06N 3/08* (2013.01); *H04L 67/1097* (2013.01)

(58) Field of Classification Search
CPC ............. H04L 67/1012; H04L 67/1097; H04L 41/5009; H04L 41/5025; H04L 67/101; H04L 67/10; H04L 47/822; G06N 3/08; H04W 28/24; H04W 72/0486; H04W 72/08; H04W 72/0493; H04W 28/08
See application file for complete search history.

(56) References Cited

U.S. PATENT DOCUMENTS

| | | |
|---|---|---|
| 9,274,817 B1 | 3/2016 | Fan et al. |
| 10,321,285 B2 | 6/2019 | Senarath et al. |
| 2005/0188075 A1* | 8/2005 | Dias ............... H04L 67/1031 709/224 |
| 2010/0306495 A1* | 12/2010 | Kumano ............ G06F 3/0665 711/170 |
| 2015/0199253 A1* | 7/2015 | Sprague ........... G06F 11/3485 709/224 |
| 2015/0199388 A1* | 7/2015 | Hrischuk .......... G06F 11/3442 707/802 |
| 2015/0350050 A1* | 12/2015 | Huang .............. H04L 43/0888 703/21 |
| 2016/0328246 A1* | 11/2016 | Broz ................ G06F 9/44505 |

(Continued)

FOREIGN PATENT DOCUMENTS

WO    2019078556 A1    4/2019

OTHER PUBLICATIONS

International Search Report and Written Opinion for Application No. PCT/US21/15088 dated Apr. 9, 2021, 16 pages.

*Primary Examiner* — Hitesh Patel
(74) *Attorney, Agent, or Firm* — Haynes and Boone, LLP

(57) ABSTRACT

A system, method, and machine-readable storage medium for providing a set of recommended quality of service (QoS) settings are provided. In some embodiments, providing the recommendation includes receiving a set of QoS settings of a volume for a client, a set of measured QoS metrics of the volume for the client, and a measure of load for a slice service corresponding to the volume. Providing the recommendation further includes determining a predicted QoS metric of the volume and a predicted load of the slice service. Providing the recommendation also includes determining, based on the predicted QoS metric, the predicted load, and the set of QoS settings, a set of recommended QoS settings to the client. The set of QoS settings of the volume for the client is then updated with the set of recommended QoS settings.

19 Claims, 8 Drawing Sheets

(56) References Cited

U.S. PATENT DOCUMENTS

| | | | |
|---|---|---|---|
| 2017/0115878 A1* | 4/2017 | Dewaikar | G06F 3/0631 |
| 2017/0168729 A1* | 6/2017 | Faulkner | G06F 11/3034 |
| 2017/0308305 A1* | 10/2017 | Goel | G06F 3/0641 |
| 2018/0004452 A1* | 1/2018 | Ganguli | H04L 41/5009 |
| 2018/0081832 A1* | 3/2018 | Longo | G06F 11/3433 |
| 2018/0351876 A1* | 12/2018 | Ren | H04L 47/805 |
| 2019/0265915 A1* | 8/2019 | Greenwood | G06F 3/0689 |
| 2019/0334770 A1 | 10/2019 | Xiang et al. | |
| 2019/0342379 A1 | 11/2019 | Shukla et al. | |
| 2020/0120131 A1* | 4/2020 | Soni | H04L 41/0896 |
| 2020/0242000 A1* | 7/2020 | Khosrowpour | G06F 11/3428 |
| 2021/0342245 A1* | 11/2021 | Doddaiah | G06F 11/3466 |

* cited by examiner

QUALITY OF SERVICE (QOS) SETTINGS OF VOLUMES IN A DISTRIBUTED STORAGE SYSTEM

TECHNICAL FIELD

The present description relates to data storage systems, and more specifically, to a system, method, and machine-readable storage medium for improving quality of service (QoS) settings in a distributed storage system for efficiency, and/or improved user experience.

BACKGROUND

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster.

One way of attempting to provide a better client experience is by allowing clients to set a quality of service (QoS) that guarantees a particular level of performance for volumes. For example, QoS may guarantee a particular level of performance by provisioning minimum, maximum, and burst levels of input/output operations per second (IOPS) to volumes.

BRIEF DESCRIPTION OF THE DRAWINGS

The present disclosure is best understood from the following detailed description when read with the accompanying figures.

DETAILED DESCRIPTION

Figure 1:
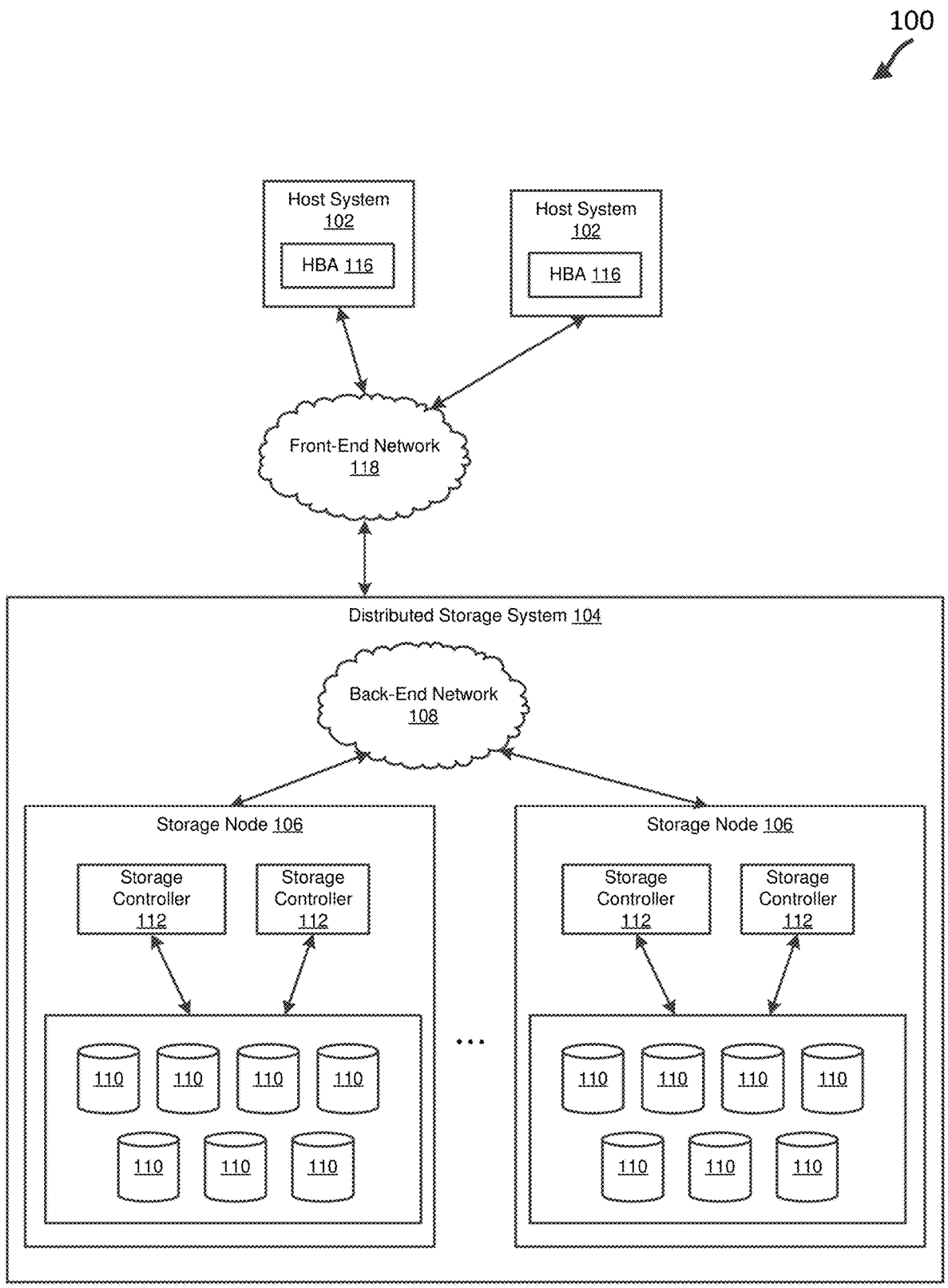
FIG. 1 is a schematic diagram of a computing architecture according to one or more aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

A distributed storage system may include one or more storage nodes, and each storage node may include one or more slice services. Each slice service may include one or more volumes, and a client may store data to multiple volumes, retrieve data from multiple volumes, and/or modify data stored on multiple volumes. The distributed storage system provides a quality of service (QoS) that guarantees a level of performance by provisioning a set of QoS metrics. A QoS metric may be, for example, input/output operations per second (IOPS), and the set of QoS metrics may include a minimum IOPS value assigned to a volume, a maximum IOPS value assigned to the volume, and/or a burst IOPS value assigned to the volume. Other QoS metrics may be, for example, bandwidth and/or latency. One QoS metric or a combination of QoS metrics may be provisioned for a client.

Provisioning IOPS to volumes, however, may be highly dynamic and complex, especially across many volumes or slice services. For example, access to a volume by a client may change frequently. Accordingly, the client may repeatedly need to pay attention and provision IOPS to volumes frequently. Additionally, the level of complexity may be difficult to understand for many clients. Accordingly, clients may consistently misconfigure their QoS settings (e.g., by over-provisioning or under-provisioning their minimum, maximum, and burst levels of IOPS). Such misconfiguration may lead to suboptimal utilization of the QoS feature and may degrade volume and overall slice service performance.

To optimize QoS settings for a client, QoS metrics may be used to determine general metrics of perceived load or "pushback" on volume or a plurality of volumes. An example of such a metric may include load. An example of a load may include a slice service load (ssLoad). Each slice service may have an ssLoad, which may refer to a measured process variable that determines QoS pushback. QoS may be enforced by throttling one or more volumes. A volume may be throttled by injecting latency into the volume, resulting in degradation of performance for the entire slice service corresponding to the volume. It may be desirable to determine, based on the client's current and historical usage of the volume, an optimal QoS setting of the volume to reduce throttling in the system, thereby minimizing ssLoad. For example, if the ssLoad value of a slice service is within a first range (e.g., 0 and 38, where 38 is exclusive in the first range), the storage operating system does not throttle the volumes residing on the slice service. Additionally, if the ssLoad value of the slice service is within a second range (e.g., 38-60, where 60 is exclusive in the first range), the storage operating system may throttle the volumes (e.g., all volumes) residing on the slice service linearly (e.g., from the maximum IOPS value to the minimum IOPS value) based on the client QoS settings. Additionally, if the ssLoad value of the slice service is within a third range (e.g., 60-100), the storage operating system may throttle the volumes (e.g., all volumes) residing on the slice service using an inverse exponential function towards 0.

The present application describes a QoS module for providing a client with a set of recommended QoS settings based on the client's current and historical usage of the volume. Different volumes have different workloads, and an optimal set of QoS settings assigned to a volume may be based on particular application workloads (e.g., database application workload, etc.) being processed on the volume. The QoS module may be unable to determine the application workloads processing on the volumes. To overcome this problem, the QoS module may use trained neural networks to identify the most likely application workload type processing on the volume. For example, the QoS module may characterize workloads based on time series shape clustering, tag workloads based on one or more workload characteristics of the volume, and determine a predicted QoS metric (e.g., predicted IOPS) of the volume and a predicted ssLoad of the volume. The QoS module may determine the set of recommended QoS settings based on performing actions discussed in the present disclosure. The client may decide whether to replace the client's current QoS settings with the set of recommended QoS settings, while in other examples the slice service(s) may automatically adopt the recommended QoS settings from the QoS module. A user may opt into providing information to the QoS module and/or allowing their QoS settings to be automatically adjusted based on the recommended QoS settings.

FIG. 1 is a schematic diagram of a computing architecture 100 according to one or more aspects of the present disclosure. The computing architecture 100 includes one or more host systems 102 (hosts), each of which may interface with a distributed storage system 104 to store and manipulate data. The distributed storage system 104 may use any suitable architecture and protocol. For example, in some embodiments, the distributed storage system 104 is a Solid-Fire® system, a StorageGRID® system, an OpenStack® Swift system, a Ceph system, or other suitable system. The distributed storage system 104 includes one or more storage nodes 106 over which the data is distributed. The storage nodes 106 are coupled via a back-end network 108, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some embodiments, the storage nodes 106 are coupled by a transmission control protocol/Internet protocol (TCP/IP) back-end network 108, which may be local to a rack or datacenter, although additionally or in the alternative, the network 108 may extend between sites in a WAN configuration or be a virtual network extending throughout a cloud. The storage nodes 106 may be as physically close or as widely dispersed as the application may warrant. In some examples, the storage nodes 106 are housed in the same racks. In other examples, storage nodes 106 are located in different facilities at different sites anywhere in the world. The node arrangement may be determined based on cost, fault tolerance, network infrastructure, geography of the hosts, and/or other considerations.

In the illustrated embodiment, the computing architecture 100 includes a plurality of storage nodes 106 in communication with a plurality of hosts 102. It is understood that for clarity and ease of explanation, only a limited number of storage nodes 106 and hosts 102 are illustrated, although the computing architecture 100 may include any number of hosts 102 in communication with a distributed storage system 104 containing any number of storage nodes 106. An example storage system 104 receives data transactions (e.g., requests to read and/or write data) from the hosts 102 and takes an action such as reading, writing, or otherwise accessing the requested data so that the storage devices 110 of the storage nodes 106 appear to be directly connected (local) to the hosts 102. This allows an application running on a host 102 to issue transactions directed to the data of the distributed storage system 104 and thereby access this data as easily as it can access data on storage devices local to the host 102. In that regard, the storage devices 110 of the distributed storage system 104 and the hosts 102 may include hard disk drives (HDDs), solid state drives (SSDs), storage class memory (SCM), RAM drives, optical drives, and/or any other suitable volatile or non-volatile data storage medium. Further, one or more of the storage nodes 106 may be connected to one or more cloud storage providers according to embodiments of the present disclosure, and likewise appear to be directly connected (local) to the hosts 102.

With respect to the storage nodes 106, an exemplary storage node 106 contains any number of storage devices 110 in communication with one or more storage controllers 112. The storage controllers 112 exercise low-level control over the storage devices 110 in order to execute (perform) data transactions on behalf of the hosts 102, and in so doing, may group the storage devices for speed and/or redundancy using a protocol such as RAID (Redundant Array of Independent/Inexpensive Disks) or error correction coding, to name just a few examples. The grouping protocol may also provide virtualization of the grouped storage devices 110. At a high level, virtualization includes mapping physical addresses of the storage devices into a virtual address space and presenting the virtual address space to the hosts 102, other storage nodes 106, and other requestors. In some examples, the storage controller(s) may be slice services as discussed further herein, and the storage devices 110 may be organized within block services as also further discussed herein. In such examples, virtual addresses within the virtual address space may be mapped to hashed block identifiers (generated from the content of the blocks) by the slice services. Moreover, the block identifiers may be mapped to physical addresses of the storage devices by the block services. Finally, while the storage controller(s) are illustrated communicating to storage devices 110 on the same storage node 106, in some embodiments the storage devices 110 may be at different storage nodes than the storage controller(s) to provide additional fault protections (e.g., a slice service may be on a different node than a block service where data is stored).

Further, an example storage node 106 may be connected to one or more cloud storage providers of varying levels (e.g., standard cloud storage or lower-class cloud storage, or both, for example, S3® or GLACIER® storage classes). The storage node 106 connected to one or more cloud storage providers may exercise protocol-level control over the allocated cloud storage space available to it on behalf of the hosts 102. Such control may be via one or more protocols such as HyperText Transfer Protocol (HTTP), HyperText Transfer Protocol Secure (HTTPS), etc. In addition to storage nodes, the distributed storage system 104 may include ancillary systems or devices (e.g., load balancers).

Turning now to the hosts 102, a host 102 includes any computing resource that is operable to exchange data with the distributed storage system 104 by providing (initiating) data transactions to the distributed storage system 104. In an example embodiment, a host 102 includes a host bus adapter (HBA) 116 in communication with the distributed storage system 104. The HBA 116 provides an interface for communicating, and in that regard, may conform to any suitable hardware and/or software protocol. In various embodiments, the HBAs 116 include serial attached small computer system interface (SCSI), Internet SCSI (iSCSI), InfiniBand, Fibre Channel (FC), and/or Fibre Channel over Ethernet (FCoE) bus adapters. Other suitable protocols include serial advanced technology attachment (SATA), eSATA, parallel advanced technology attachment (PATA), universal serial bus (USB), and FireWire, or the like. In some example, the host HBAs 116 are coupled to the distributed storage system 104 via a front-end network 118, which may include any number of wired and/or wireless networks such as a LAN, an Ethernet subnet, a PCI or PCIe subnet, a switched PCIe subnet, a WAN, a MAN, the Internet, or the like. To interact with (e.g., read, write, modify, etc.) remote data, the HBA 116 of a host 102 sends one or more data transactions to a storage node 106 via the front-end network 118. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

While the storage nodes 106 and the hosts 102 are referred to as singular entities, a storage node 106 or host 102 may include any number of computing devices and may range from a single computing system to a system cluster of any size. Accordingly, each storage node 106 and host 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic HDDs, SSD, or an optical memory (e.g., compact disk read-only memory (CD-ROM), digital versatile disk (DVD), Blu-ray disk (BD)); a video controller such as a graphics processing unit (GPU); a communication interface such as an Ethernet interface, a Wi-Fi (IEEE 802.11 or other suitable standard) interface, or any other suitable wired or wireless communication interface; and/or a user input/output (I/O) interface coupled to one or more user I/O devices such as a keyboard, mouse, pointing device, or touchscreen.

Figure 2:
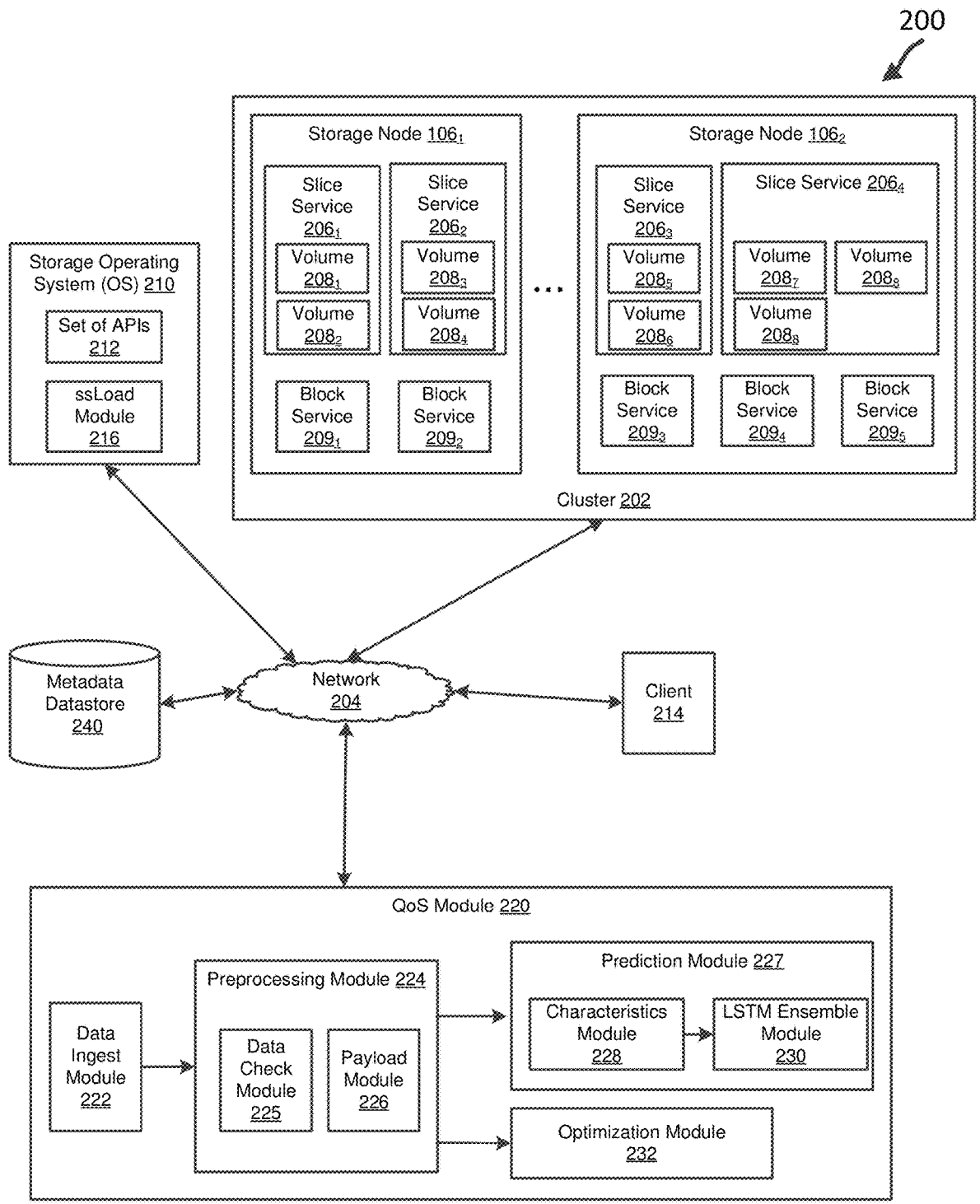
FIG. 2 is a schematic diagram of a cluster of storage nodes coupled to a quality of service (QoS) module according to one or more aspects of the present disclosure.

FIG. 2 is a schematic diagram 200 of a cluster 202 of storage nodes 106 coupled to a quality of service (QoS) module 220 according to one or more aspects of the present disclosure. The QoS module 220 may govern or guarantee levels of performance (e.g., IOPS, bandwidth, etc.) for volumes residing in the cluster 202. The cluster 202 includes a plurality of storage nodes 106, and each storage node 106 may include one or more slice services 206 as well as one or more block services 209. One or more volumes 208 may be maintained by a slice service 206. In the example illustrated in FIG. 2, the cluster 202 may include storage node $106_1$ including a slice service $206_1$ and a slice service $206_2$, with the slice service $206_1$ including volumes $208_1$ and $208_2$ and the slice service $206_2$ including volumes $208_3$ and $208_4$. The cluster 202 may also include storage node $106_2$ including a slice service $206_3$ and a slice service $206_4$, with the slice service $206_3$ including volumes $208_5$ and $208_6$ and the slice service $206_4$ including volumes $208_7$, $208_8$, $208_9$. These are merely examples, and it should be understood that a storage node 106 may include any number of slice services (e.g., one or more slice services), and a slice service may include any number of volumes (e.g., one or more volumes).

Clients may store data to, retrieve data from, and/or modify data stored at the cluster 202. A client 214 may include client processes that may exist on one or more physical machines. When the term "client" is used in the disclosure, the action being performed may be performed by a client process. A client process may be responsible for storing, retrieving, and deleting data in the system 100. A client process may address pieces of data depending on the nature of the storage system and the format of the data stored. For example, the client process may reference data using a client address. The client address may take different forms. For example, in a storage system that uses file storage, the client 214 may reference a particular volume or partition, and a file name. With object storage, the client address may be a unique object name. For block storage, the client address may be a volume or partition, and a block address. Clients 108 communicate with metadata, which corresponds to the slice services and the volume(s) residing on the slice services, using different protocols, such as SCSI, iSCSI, FC, common Internet file system (CIFS), network file system (NFS), HTTP, web-based distributed authoring and versioning (WebDAV), or a custom protocol. Each client 214 may be associated with a volume. In some examples, only one client 214 accesses data in a volume. In some examples, multiple clients 214 may access data in a single volume.

Data from the clients may be stored non-sequentially. In various implementations, non-sequentially storing data in storage is based upon breaking data up into one more storage units, e.g., data blocks. A data block may refer to raw data for a volume and may be the smallest addressable unit of data. The slice services and/or the client 214 may break data into data blocks. Data blocks can be of a fixed size, can be initially a fixed size but compressed, or can be of a variable size. Data blocks can also be segmented based on the contextual content of the block. For example, data of a particular type may have a larger data block size compared to other types of data.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content (e.g., a cryptographic hash function (e.g., Skein algorithm) that generates a hash value identified herein as the "block identifier"). The block identifier is unique to that block of data. For example, blocks with the same content have the same block identifier, but blocks with different content have different block identifiers. The values of possible unique identifiers can have a uniform distribution. The bin assignments may be stored in a distributed key-value store across the cluster illustrated in FIG. 2 (e.g., in a so-called "zookeeper" database as just one example). Accordingly, storing data blocks based upon the unique identifier, or a portion of the unique identifier, results in the data being stored substantially evenly across drives in the cluster. Because client data, e.g., a volume associated with the client, is spread evenly across all of the drives in the cluster, every drive in the cluster may be involved in the read and write paths of each volume. This configuration may balance the data and load across all of the drives. Such an arrangement may remove hot spots within the cluster, which can occur when the client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Because clients have their data spread substantially evenly through all the drives in the storage system, a performance of the system can be described in aggregate as a single number, e.g., the sum of performance of all the drives in the storage system. Block services 209 and slice services 206 may maintain mappings between the client's address the eventual physical location of the data block in respective storage media of one or more storage nodes 106. A volume includes these unique and uniformly random identifiers, and so a volume's data is also evenly distributed throughout the cluster.

The slice services 206 may store metadata that maps between clients 214 and block services 209. For example, slice services 206 may map between the client addressing used by clients 108 (e.g., file names, object names, block numbers, etc. such as LBAs) and block layer addressing (e.g., block identifiers) used in block services 209. Further, block services 209 may map between the block layer addressing (e.g., block identifiers) and the physical location of the data block on one or more storage devices. The blocks may be organized within bins maintained by the block services 209 for storage on physical storage devices (e.g., SSDs). A bin may be derived from the block ID for storage of a corresponding data block by extracting a predefined number of bits from the block identifiers introduced above.

In an embodiment, the bin may be divided into buckets or "sublists" by extending the predefined number of bits extracted from the block identifier. A bin identifier may be used to identify a bin within the system. The bin identifier may also be used to identify a particular block service 209 (e.g., $209_1$-$209_5$ in the simple example of FIG. 2) and associated storage device (e.g., SSD). A sublist identifier may identify a sublist with the bin, which may be used to facilitate network transfer (or syncing) of data among block services in the event of a failure or crash of a storage node. Accordingly, a client can access data using a client address which is eventually translated into the corresponding unique identifiers that reference the client's data at the storage node 106.

Although the parts of the system 100, 200 are shown as being logically separate, entities may be combined in different ways. For example, functions discussed in the present disclosure may be combined into a single process or single machine (e.g., a computing device) and multiple functions or all functions may exist on one machine or across multiple machines. Additionally, when operating across multiple machines, the machines may communicate using a network interface, such as a local area network (LAN) or a wide area network (WAN). In some implementations, slice services 206 may be combined with one or more block services 209 in a single machine. Additionally or alternatively, entities in system 100, 200 may be virtualized entities. Entities may also be included in a cluster, where computing resources of the cluster are virtualized such that the computing resources appear as a single entity.

For each volume hosted by a slice services 206, a list of block identifiers may be stored with one block identifier for each logical block on the volume. Each volume may be replicated between one or more slice services 206 and/or storage nodes 106, and the slice services for each volume may be synchronized between each of the slice services hosting that volume. Accordingly, failover protection is provided in case a slice service 206 fails, such that access to each volume may continue during the failure condition.

The above structure allows storing of data evenly across the cluster of storage devices (e.g., SSDs), which allows for performance metrics to manage load in the system 100, 200. For example, if the system 100, 200 is under a load, clients can be throttled or locked out of a volume. When a client is locked out of a volume, a slice service 206 or volume 208 may close the command window or reduce or zero the amount of read or write data that is being processed at a time for client 214. The slice service 206 or the volume 208 can queue access requests for client 214, such that I/O requests from the client 214 can be processed after the client's access to the volume resumes after the lock out period.

In relation to QoS, client QoS settings are variables that can be set that define the desired QoS bounds for a client and accordingly can be used to affect how a client uses the storage system. A user (e.g., an administrator and/or a client) may set the client QoS settings of a volume for a client. Performance and capacity can be provisioned for volumes independently of each other. In an example, the client 214 may access the volume $208_1$, and the client 214 may set the client QoS settings for the volume $208_1$ to enforce upper and lower bounds on a first QoS metric. Additionally, the client 214 may access the volume $208_7$, and the client 214 may set the client QoS settings for the volume $208_7$ to enforce upper and lower bounds on a second QoS metric different from the first QoS metric.

A QoS metric may be, for example, IOPS, which is a unit of measure of input/output operations per second. The client 214's QoS IOPS settings for the volume $208_1$ may include, for example, a minimum IOPS value, a maximum IOPS value, and/or a burst IOPS value for the volume. The minimum IOPS value for a volume may refer to a guaranteed number of IOPS at which the volume will perform, assuming that the cluster 202 in which the volume resides is not over-provisioned. The maximum IOPS configuration for each node may vary from node type to node type. An example maximum configuration for a node type may be 75,000 IOPS. In an example, if the sum of the minimum IOPS settings of the volumes across the node exceeds 75,000 (e.g., there are 3 volumes with 30,000 minimum IOPS settings), then the cluster may be said to be over-provisioned with respect to IOPS.

The maximum IOPS value for a volume may refer to the number of IOPS at which the volume will be throttled. The burst IOPS value for a volume may be the number of IOPS that a volume will be able to perform at beyond the maximum IOPS value setting for a short amount of time based upon burst IOPS credits. Burst IOPS credits may be accrued when the volume has been performing at fewer than the maximum IOPS value for an extended amount of time. For example, a volume may accrue one burst IOPS credit for each second the volume performs under the maximum IOPS value, and the volume may spend or use one burst IOPS credit for each second the volume spends performing above the maximum IOPS value. A volume may accrue a maximum number of burst IOPS credits (e.g., sixty burst IOPS credits). Although the application may describe the QoS metric as being in terms of IOPS, it should be understood that embodiments of the disclosure may also apply to other QoS metrics (e.g., bandwidth, latency, etc.).

Each slice service 206 may have a respective storage operating system (OS) 210. Moreover, one of the storage OS 210 may operate as a cluster manager to other slice services 206 within the cluster. Should that slice service 206 with storage OS 210 operating as cluster manager fail, another storage OS 210 may assume that rule in its place. The storage OS 210 may track usage (e.g., read, write, and/or modify requests) per volume, per client. Although the storage OS 210 is shown as being separate from the storage node 106, it should be understood that in other examples the storage OS 210 may be located on each storage node 106 or on another component in FIG. 1 or FIG. 2. A client may access multiple volumes, and multiple clients may access the same volume. The same volume may be assigned the same and/or different minimum IOPS value, maximum IOPS value, and/or burst IOPS value for each client accessing the volume. The storage OS 210 may store the usage information per client, per volume into a metadata datastore 240 (which may be within main memory of a storage node 106, for example, or a storage device such as an SSD associated with a slice service 206 as another example).

The storage OS 210 may balance volumes 208 on the slice services 206 across the storage nodes 106 based on their guaranteed QoS settings. The severity of the throttling across slice services 206 is based on a service load (ssLoad) value. For example, the storage OS 210 may inject latency on I/O operations to keep volumes within their allocated QoS domains. Each slice service 206 may have its own ssLoad value at any given time. An ssLoad value is the measured process variable that determines QoS pushback, and the storage OS 210 enforces QoS by throttling one or more volumes. In other words, throttling is the mechanism by which the QoS is enforced. Throttling a volume acts by restricting the number of IOPS that the volume is allowed to perform, for each sample period (e.g., every 500 milliseconds).

Data stored on the volume $208_1$ may be replicated to another volume (e.g., the volume $208_5$) that resides on a slice service $206_3$ different from the slice service $206_1$ on which the volume $208_1$ resides. If the volume $208_1$ reaches I/O levels that reach the maximum IOPS value, the storage OS 210 may start to throttle the volume $208_1$ by injecting latency into the volume, resulting in degradation of performance for the entire slice service $206_1$ on which the volume $208_1$ resides as well as for the entire slice service $206_3$ on which the volume $208_5$ resides. If the storage OS 210 throttles a slice service 206, the storage OS 210 may throttle each of the volumes residing on that slice service 206. Accordingly, if the storage OS 210 throttles the volume $208_1$, the storage OS 210 also throttles the volume $208_1$'s replicated volume (e.g., volume $208_5$) and the slice services $206_1$ and $206_3$ on which the volumes reside. Such latency injection may enable predictable and consistent performance across all volumes and may eliminate the "noisy problem," which may occur when a volume's I/O spikes and "takes" I/O from other volumes that reside on the same nodes.

The storage OS 210 may include an ssLoad module 216 that calculates the ssLoad value for one or more slice services. An ssload may measure the load on a slice service, and throttle is the pushback on all volumes on a slice service. It should be understood that although ssLoad is discussed in the present disclosure as being the load measurement, other load measurements may be used in other examples. The ssLoad module 216 may determine a primary write service load, a secondary write service load, and a latency service load. The primary write service load may refer to a fullness of a particular slice service 206's primary cache (e.g., percentage of the primary cache that is used), and the secondary write service load may refer to a fullness of a particular slice service 206's secondary cache (e.g., percentage of the secondary cache that is used). Additionally, the latency service load may refer to a perceived latency for volume I/O on the particular slice service 206, where latency service load is a number between 0 and 100, inclusive (as just one example). The ssLoad module 216 may increase the latency service load (e.g., by one) when volumes residing on the slice service 206 are observed to be unable to reach their minimum IOPS value due to latency; otherwise the ssLoad module 216 decreases the latency service load (e.g., by one).

The ssLoad module 216 determines the ssLoad for the particular slice service 206 by performing the following operation, which may also be referred to as a pushback calculation: ssLoad=maximum (primary write service load, secondary write service load, latency service load), where ssLoad is a number between 0 and 100, inclusive.

Figure 3:
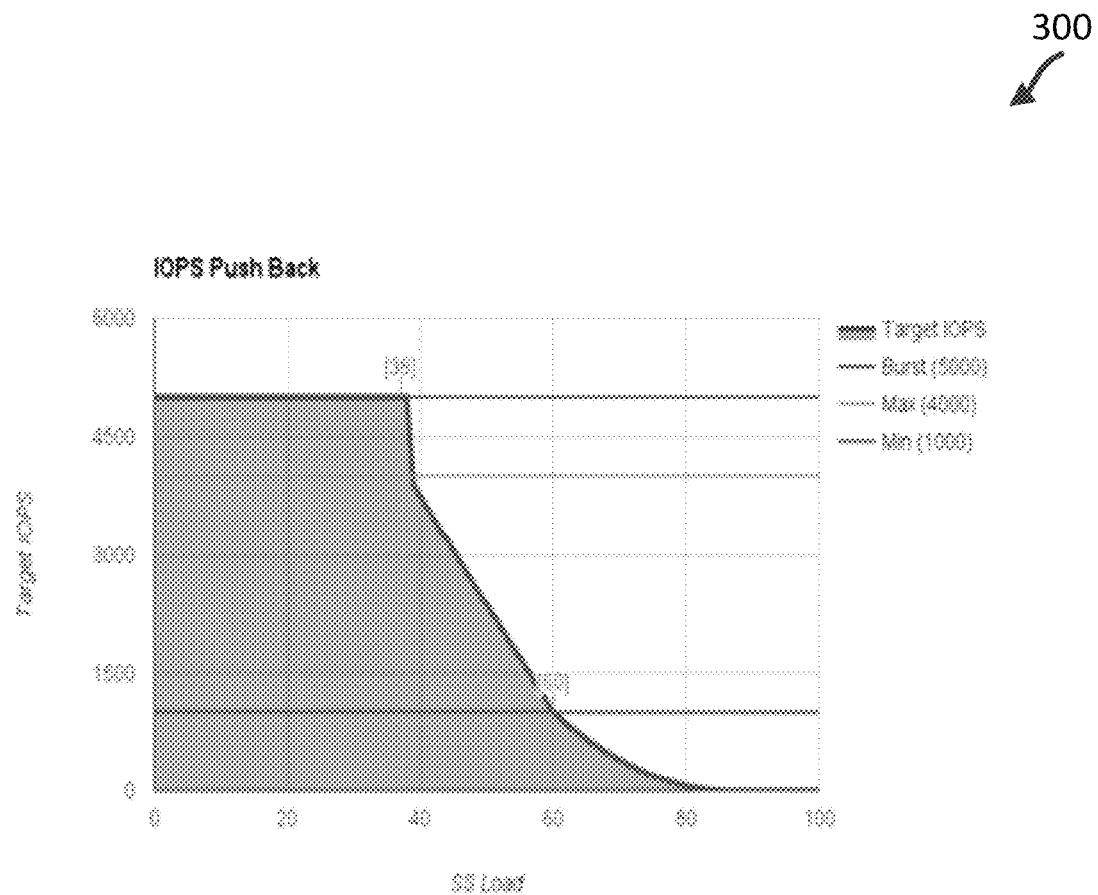
FIG. 3 is a graph illustrating input/output operations per second (IOPS) pushback according to one or more aspects of the present disclosure.

FIG. 3 is a graph 300 illustrating an example of IOPS pushback (such as according to the ssLoad calculation determined by ssLoad module 216) for an exemplary slice service 206. As shown in the example of FIG. 3, if the ssLoad value is within a first range (e.g., 0 and 38, where 38 is exclusive in the first range), the storage OS 210 does not throttle the volumes residing on the slice service 206. If the ssLoad value is within a second range (e.g., 38-60, where 60 is exclusive in the second range), the storage OS 210 may throttle the volumes (e.g., all volumes) residing on the slice service 206 linearly from the maximum IOPS value to the minimum IOPS value based on the client QoS settings. If, instead, the ssLoad value is within a third range (e.g., 60-100), the storage OS 210 may throttle the volumes (e.g., all volumes) residing on the slice service 206 using an inverse exponential function towards 0. Accordingly, if the user misconfigures the client QoS settings for the volumes, a slice service may be unnecessarily slow when responding to client requests. It should be understood that the above ranges are provided as examples and may vary in other examples.

Referring back to FIG. 2, the storage OS 210 may be included in one or more of the storage nodes 106 or may be separate from the storage nodes 106 and communicate with the storage nodes 106 through a network 204. The network 204 may correspond to the front-end network 118 and/or the back-end network 108. The storage OS 210 may expose a set of application programming interface (APIs) 212 that when invoked provide information about one or more storage nodes 106 included in the cluster 202.

A QoS module 220 includes a data ingest module 222, a preprocessing module 224, a prediction module 227, and an optimization module 232. The QoS module 220 may invoke one or more APIs of the set of APIs 212 to retrieve information about, for example, the client 214's usage of a particular volume. The data ingest module 222 may invoke one or more APIs of the set of APIs 212 to retrieve QoS information regarding the client 214's actual usage of the volume $208_1$, the client 214's QoS settings for the volume $208_1$, and an ssLoad of the slice service $206_1$ on which the volume $208_1$ resides. Although in the example illustrated in FIG. 2, the QoS module 220 is separate from the storage OS 210 and the cluster 202, in other examples one or more components of the QoS module 220 may reside as part of the storage OS 210 and/or as part of the cluster 202.

The data ingest module 222 may transmit the QoS information to the preprocessing module 224, which includes a data check module 225 and a payload module 226 that will be described in more detail below. The preprocessing module 224 may perform actions on the QoS information for processing by the prediction module 227 and the optimization module 232. The preprocessing module 224 may analyze the workload of the volume $208_1$ and classify the volume based on one or more workload characteristics. The prediction module 227 includes a characteristics module 228 and a long short term memory (LSTM) ensemble module 230 that will be discussed in more detail below. An LSTM is a type of neural network. Although the LSTM neural network may be described in the examples below, it should be understood that in other examples other types of neural networks may be used. The optimization module 232 may determine a set of optimal QoS settings for the volume based on the client's historical, current, and predicted usage of the volume. The optimal QoS settings may include an optimized minimum IOPS value, an optimized maximum IOPS value, and an optimized burst IOPS value for the volume. Although particular components (e.g., data ingest module 222, preprocessing module 224, prediction module 227, and optimization module 232) are shown as being included in the QoS module 220, it should be understood that in other examples, one or more of these components may reside separate from the QoS module 220.

The data ingest module 222, the preprocessing module 224, the prediction module 227, and the optimization module 232 are discussed in further detail in FIGS. 4-7 below.

Figure 4:
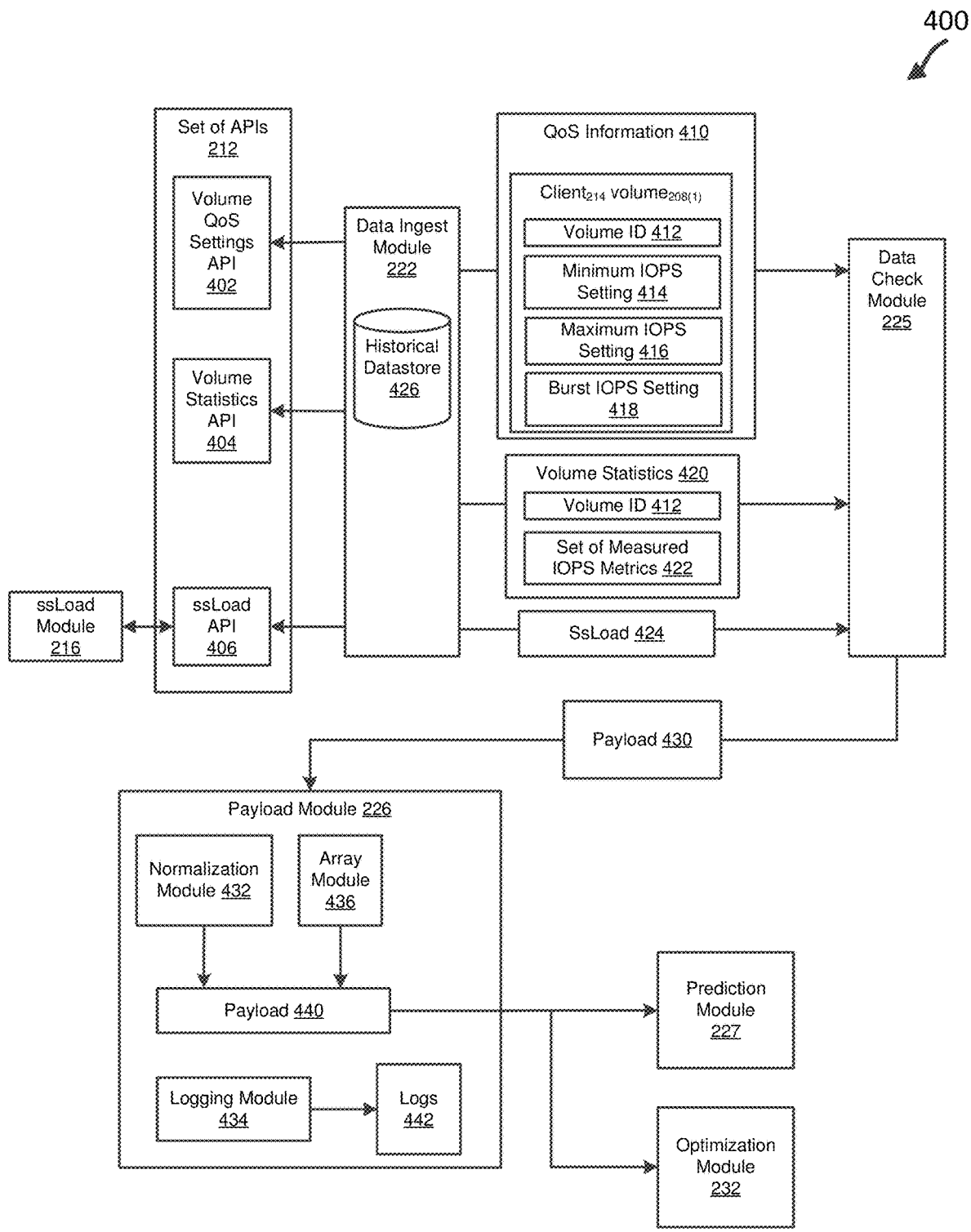
FIG. 4 is a schematic diagram of processing of client QoS information according to one or more aspects of the present disclosure.

FIG. 4 is a schematic diagram 400 of client QoS information being processed by one or more components of the QoS module 220 (see FIG. 2) according to one or more aspects of the present disclosure. In the example illustrated in FIG. 4, in keeping with the above example, the client 214 may store, retrieve, modify, and/or move data stored in association with the volume $208_1$ residing on the slice service $206_1$. The set of APIs 212 may include a volume QoS settings API 402, a volume statistics API 404, and an ssLoad API 406. It should be understood that the set of APIs 212 may include additional APIs than those shown in FIG. 4.

The data ingest module 222 may invoke the volume QoS settings API 402 to retrieve QoS information 410 associated with the volume $208_1$ for the client 214. In the example illustrated in FIG. 4, the client QoS information 410 may provide information on how the client 214's QoS settings are assigned to the volume $208_1$ accessed by the client 214. The QoS information 410 may include the volume identifier (ID) 412 that identifies the volume $208_1$, a minimum IOPS setting 414 of the volume $208_1$ for the client 214, a maximum IOPS setting 416 of the volume $208_1$ for the client 214, and a burst IOPS setting 418 of the volume $208_1$ for the client 214. The QoS information 410 may include static data that does not change very often.

The volume QoS settings API 402 may transmit a first payload including the QoS information 410 to the data ingest module 222, which captures the first payload and transmits it to the data check module 225 for processing. A user (e.g., an administrator or the client 214) may assign the minimum IOPS setting 414, the maximum IOPS setting 416, and the burst IOPS setting 418 to the volume identified by the volume ID 412 (e.g., volume $208_1$) for the client 214. Additionally, the user may adjust the minimum IOPS setting 414, the maximum IOPS setting 416, and the burst IOPS setting 418 by increasing or decreasing the applicable value.

The data ingest module 222 may invoke the volume statistics API 404 to retrieve volume statistics 420 of the volume $208_1$ for the client 214. The volume statistics 420 may provide information on the client 214's actual usage of the volume $208_1$. The volume statistics 420 may include the volume ID 412 that identifies the volume $208_1$ and a set of measured IOPS metrics 422. The set of measured IOPS metrics 422 may include one or more actual number of IOPS for the volume $208_1$ per time interval (e.g., 500 milliseconds, per day). The information included in the set of measured IOPS metrics 422 may include time series data that is in sequence and timestamped. For example, set of measured IOPS metrics 422 may include 100 IOPS for a first time interval (e.g., timestamped with time T0 to 500 milliseconds), 105 IOPS for a second time interval (e.g., timestamped with time T0+500 milliseconds to T0+1 second), and 110 IOPS for a third time interval (e.g., timestamped with time T0+1 second to T0+1.5 seconds). The set of measured IOPS metrics 422 may include dynamic data that changes often. For example, the next time that the volume statistics API 404 is invoked by the data ingest module 222, the set of measured IOPS metrics 422 may include actual IOPS for the volume $208_1$ during a fourth time interval and subsequent time intervals.

The volume statistics API 404 may transmit a second payload including the volume statistics 420 to the data ingest module 222, which captures the second payload and transmits it to the data check module 225 for processing.

The data ingest module 222 may invoke the ssLoad API 406 to retrieve an ssLoad 424 of the slice service $206_1$ on which the volume $208_1$ resides. The ssLoad API 406 may request the services of the ssLoad module 216 to calculate the ssLoad for one or more slice services. The ssLoad API 406 may transmit the ssLoad 424 to the data ingest module 222, which receives the ssLoad 424 and transmits it to the data check module 225 for processing.

The data ingest module 222 may store the information received based on invocation of the volume QoS settings API 402 (e.g., the client QoS information 410), the volume statistics API 404 (e.g., the volume statistics 420), and/or the ssLoad API 406 (e.g., the ssLoad 424) into a historical database 426. The historical database 426 may be used to analyze, for example, usage trends and compare previous QoS settings to current QoS settings.

The data check module 225 may receive from the data ingest module 222 the first payload including the QoS information 410, the second payload including the volume statistics 420, and the ssLoad 224. In some examples, the first and second payloads include JavaScript Object Notation (JSON) data storing the applicable information, and the data ingest module 222 may transmit raw JSON data to the data check module 225. JSON data may be written in the form of name-value pairs, where a name-value pair includes a field name and a value of the field. The data check module 225 may parse and process the JSON fields and ensure data integrity (e.g., perform datatype checks, etc.).

Additionally or alternatively, the data check module 225 may combine the received inputs (e.g., the first payload, the second payload, and the ssLoad 424) into a single payload. Additionally or alternatively, the data check module 225 may determine whether the first payload and/or the second payload are missing any values. In response to a determination that a payload is missing a value, the data check module 225 may estimate the missing value and replace the missing value with the estimated value. The data check module 225 may impute the missing value based on surrounding values. For example, if the measured IOPS metric for Jan. 1, 2020 is 100 IOPS, the measured IOPS metric for Jan. 2, 2020 is missing, and the measured IOPS metric for Jan. 3, 2020 is 110 IOPS in the measured IOPS metric 424, the data check module 225 may impute the measured IOPS metric for Jan. 2, 2020 by calculating the average of the measured IOPS metric for Jan. 1, 2020 and for Jan. 3, 2020, which results in 107.5 IOPS for Jan. 2, 2020. The data check module 225 may insert the imputed value (e.g., 107.5 IOPS) into the measured IOPS metric 424 accordingly.

The data check module 225 may transmit a payload 430 to the payload module 226, where the payload 430 includes an output from the data check module 225 based on parsing the first payload including the client QoS information 410, the second payload including the volume statistics 420, and the ssLoad 424, imputing any values missing in the first payload and/or second payload, and combining the first payload, the second payload, and the ssLoad 424 into a single payload 430. It should be understood that the data check module 225 may perform these actions in a different order. For example, the data check module 225 may parse the second payload for data integrity, impute any missing values included in the volume statistics 420, parse the first payload for data integrity, impute any missing values included in the client QoS information 410, and combine the processed first payload, the processed second payload, and the ssLoad 424 into the single payload 430.

The payload module 226 may receive the payload 430 and process it. The payload module 226 may include a normalization module 432, a logging module 434, and an array module 436. The normalization module 432 may transform one or more of the values included in the payload 430 to a normalized value. The values included in the payload 430 (e.g., IOPS values, etc.) may be large and may skew operation of the LSTM neural networks, which are discussed further below. Accordingly, it may be desirable for the values in the payload 430 to be scaled from 0 to 1. In some examples, the normalization module 432 may apply the Box-Cox transformation to transform non-normal dependent variables (e.g., the JSON values) into a normal shape. It should be understood that the normalization module 432 may apply other functions and/or algorithms to transform non-normal dependent variables transform non-normal dependent variables.

As discussed, the payload 430 may include time series data that is in sequence and timestamped. The array module 436 may format the data for the LSTM neural networks by, for example, creating an array and inserting the normalized values into the array in a temporal order. The array module 436 may maintain the order of the data such that, for example, a first index into an array stores data (e.g., a first value in the set of measured IOPS metrics 422) that is older than data (e.g., a second value in the set of measured IOPS metrics 422) stored in the second index of the array, the second index into the array stores data that is older than data (e.g., a third value in the set of measured IOPS metrics 422) stored in the third index of the array, and so on.

An output of the normalization module 432 and/or the array module 436 may result in a payload 440 that is transmitted to the prediction module 227 and the optimization module 232. The prediction module 227 and the optimization module 232 may be able to identify underlying patterns of the data and trends much easier because the provided data points are related to each other through time (temporally related). For example, the time series data may be used by the prediction module 227 to predict trends related to usage of the volume 208$i$ in the future.

Additionally, the logging module 434 may create one or more logs 442. For example, the logging module 434 may log details about the imputations, normalizations, errors, etc. to keep track of the data included in the payload 430 and any data modifications. It should be understood that in other examples, the payload module 226 may include or may not include at least one of the normalization module 432, the logging module 434, and/or the array module 436.

The payload 440 may include QoS setting values indicating the client 214's QoS settings (e.g., normalized QoS values on a scale from 0 to 1) of the volume 208$_1$ and indicating the client 214's utilization of the volume 208$_1$ (e.g., measured IOPS of the volume 208$_1$). The payload module 226 may transmit the payload 440 to the prediction module 227 and the optimization module 232. In some examples, the payload module 226 creates a copy of the payload 440, transmits the payload 440 to the optimization module 232, and transmits the copy to the prediction module 227. The optimization module 232 and the prediction module 227 may perform operations in parallel. Operation of the prediction module 227 will be discussed with respect to FIG. 5 below, followed by operation of the optimization module 232 discussed with respect to FIG. 6 below.

Figure 5:
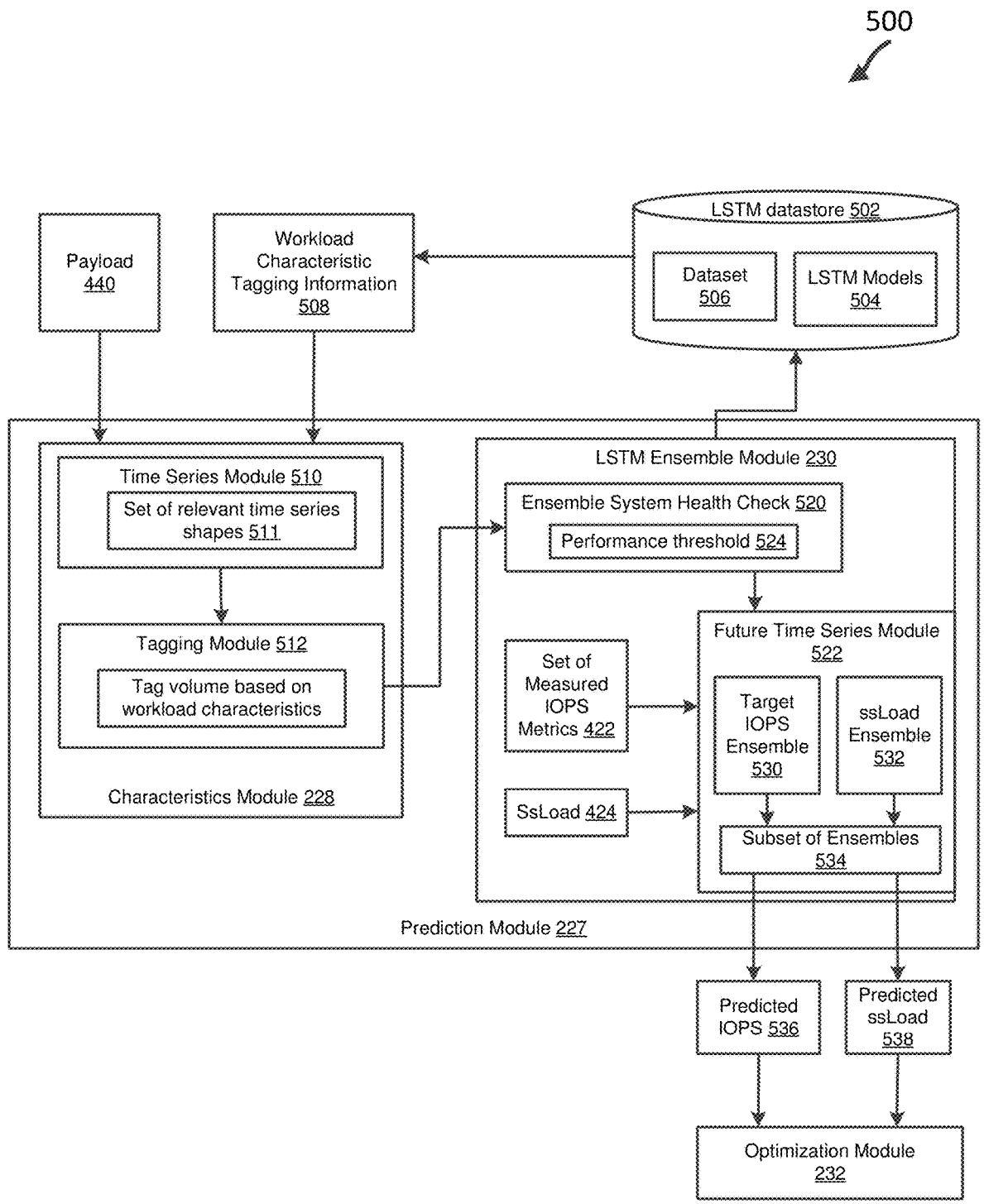
FIG. 5 is a schematic diagram of a prediction module determining a predicted IOPS for a volume and a predicted slice service load (ssLoad) for a slice service corresponding to the volume according to one or more aspects of the present disclosure.

FIG. 5 is a schematic diagram 500 of the prediction module 227 (FIGS. 2, 4) determining a predicted IOPS for a volume and a predicted ssLoad for a slice service on which the volume resides according to one or more aspects of the present disclosure. The predicted IOPS 536 of the volume 208$_1$ may refer to the number of target IOPS that the prediction module 227 predicts the volume 208$_1$ will have within a future time period (e.g., 500 milliseconds). The predicted ssLoad 538 may refer to the ssLoad value that the prediction module 227 predicts the slice service 206$_1$ to have within the time period. In the example illustrated in FIG. 5, in keeping with the above example, the client 214 may store, retrieve, modify, and/or move data stored at the volume 208$_1$ residing on the slice service 206$_1$. The prediction module 227 may consider historical, current, and future settings for usage of the IOPS across all volumes residing on a slice service and accessed by the client, and the optimization module 232 may provide a set of recommended QoS settings based on previous I/O demand, current I/O demand, and/or future predicted I/O demand of the volume.

The prediction module 227 includes the characteristics module 228 and the LSTM ensemble module 230. The LSTM ensemble module 230 may store data in and retrieve data from an LSTM datastore 502, which stores LSTM models 504 and a dataset 506. The LSTM ensemble module 230 may collect data based on sampling volumes from commonly identified workloads and may store the collected data in the dataset 506. The dataset 506 may include training datasets and testing datasets for each sample. The LSTM models 504 have been pre-trained on the dataset 506, which may include one or more application workload characteristics. These may be already known based on, for example, information provided by clients. An LSTM model 504 may include neural networks that are trained for one or more application workloads to assist the prediction module 227 in making accurate predictions and forecasts for each workload that is associated with a volume. In some examples, the LSTM ensemble module 230 identifies common application workloads with particular characteristics (e.g., low utilization, high utilization, bursty utilization, database application workloads, etc.) from the dataset 506 and tags common characteristics for each of the application workloads. Each LSTM model may be specifically trained for an application workload of a particular type. For example, a first LSTM model may be specifically trained for a database application workload, a second LSTM model may be specifically trained for a different application workload type, and so on.

The LSTM ensemble module 230 may train and validate LSTM neural networks for each common application workload. An application workload may have an associated time series shape. The same time series shape may be typical or very similar for application workloads of a same or common type (e.g., database application workloads). In some examples, the provider of the storage OS 210 may be unable to determine the client 214's actual application workload that is being processed on a volume. Volumes may have different workloads, and accordingly the different workloads may have different times series shapes. The LSTM ensemble module 230 may classify particular time series shapes with particular workloads and apply different labels to different time series shapes in the dataset 506 so that the LSTM models 504 may be trained properly. The training of the neural networks may provide more accurate time series forecasting for those specific workloads.

The characteristics module 228 may tag the volume 208$i$ used by the client 214 by using a machine learning technique. The machine learning technique may be, for example, time series or K-means clustering for time series shapes. Although time series and K-means clustering may be discussed in the present disclosure as being used to tag volumes and determine an application workload type, this is not intended to be limiting and it should be understood that other learning techniques may be used in other examples. The characteristics module 228 matches characteristics of the time series shape and tags volumes associated with the workloads that are highly related to the time series shapes. A volume may be tagged if a metadata tag is assigned to the volume. The metadata tag may indicate an application workload associated with the volume. An application workload is associated with the volume if the application workload is processed on the volume.

The characteristics module 228 includes a time series module 510 and a tagging module 512. The time series module 510 may use time series shape characteristic matching through K-means clustering to identify curve shapes of these time series and group them into different application workloads. The time series module 510 may receive the payload 440 and workload characteristic tagging information 508 as inputs. As discussed, the payload 440 may include QoS setting values indicating the client 214's QoS settings for the volume 208$_1$ and utilization of the volume 208$_1$. The time series module 510 may use the QoS setting values indicating the client 214's QoS settings for the volume 208$_1$ and utilization of the volume 208$_1$ to determine a time series shape associated with the application workloads processed on the volume 208$_1$.

The workload characteristic tagging information 508 may be retrieved from the LSTM datastore 502 and may include time series shapes that have been tagged as being of a particular application workload based on their characteristics. For example, the workload characteristic tagging information 508 may include pretrained datasets, algorithms, functions, and/or LSTMs specifying a time series shape for one or more particular application workload types (e.g., mySQL, Oracle®, etc.) having particular characteristics. For example, the workload characteristic tagging information 508 may specify that a client A uses volume 208$_2$ for a first application workload type (e.g., mySQL) and client B uses volume 208$_4$ for a second application workload type (e.g., Oracle® applications). The workload characteristic tagging information 508 may include information about volumes and particular workloads. For example, the workload characteristic tagging information 508 may include application workloads that have been tagged as having particular utilization (e.g., low utilization, high utilization, or bursty utilization) and as being of a particular application workload type. Each of the application workloads may have its own associated time series shape.

The time series module 510 may determine, based on the payload 440 and the workload characteristic tagging information 508, a set of relevant time series shapes 511 having the closest match(es) to the time series shape of the application workload processed on the volume 208$_1$. The time series module 510 may provide the set of relevant time series shapes 511 to the tagging module 512.

The tagging module 512 may match characteristics of the time series shape of the volume 208$_1$ for the client 214 with the time series shapes of application workloads associated with the set of relevant time series shapes 511. The tagging module 512 may tag the volume 208$_1$ based on one or more workload characteristics and may estimate the one or more application workload(s) for which the client 214 is using the volume 208$_1$. The tagging module 512 may determine, based on the time series shapes of particular application workloads (e.g., mySQL, Oracle®, etc.) associated with the set of relevant time series shapes 511 that for the volume 208$_1$, 40% of the workloads processed on the volume 208$_1$ are highly related to a first application workload type (e.g., very similar to the time series shape associated with mySQL), and 60% of the workloads processed on the volume 208$_1$ are highly related to a second application workload type (e.g., very similar to the time series shape associated with Oracle®). For example, the tagging module 512 may assign a metadata tag indicating that workloads of the first application type (e.g., mySQL) and workloads of the second application type (e.g., Oracle®) are processed using the volume 208$_1$. Volumes and/or the workloads associated with the volumes may be grouped together based on known volume usage (e.g., the application type being processed on the volume) and the tagged metadata. Accordingly, the time series module 510 may determine that the client 214 uses the volume 208$_1$ to process workloads of the first and second application types and assign a metadata tag to the volume 208$_1$ accordingly.

The LSTM ensemble module 230 may process a class of recurrent neural networks and predict, using LSTM neural networks and the tagged volume, a future state of the target IOPS of the volume 6081 for the client 214 and the ssLoad of the slice service 206$_1$ on which volume 6081 resides. The LSTM ensemble module 230 includes an ensemble system health check 520 and a future time series module 522. The ensemble system health check 520 accesses the LSTM datastore 502 to maintain a level of accuracy using the pretrained models for specific workload characteristics. The ensemble system health check 520 may use the training datasets and an ensemble of LSTM models 504 to predict application workloads associated with one or more testing datasets included in the dataset 506.

In some examples, the ensemble system health check 520 validates the performance of the LSTM models 504 using a predetermined performance metric. A predetermined performance metric may be, for example, root mean square error (RMSE). RMSE may refer to a standard deviation of the residuals (prediction errors), where residuals may refer to a measure of how far from the regression line data points are located. A residual may be, for example, a distance between an actual value and a predicted value (e.g., regression line and the data points above or below the line). To determine the RMSE, the ensemble system health check 520 may determine the mean error based on the residuals, calculate a square of the mean error, and calculate a square root of the squared mean error.

The ensemble system health check 520 may keep track of one or more performance thresholds 524 (e.g., 80% accuracy, 90% accuracy, etc.) and check the LSTM models 504 for performance drift. A performance threshold 524 may vary and depend on such factors as, for example, the application workload type and/or the data set being applied. Performance drift may occur if a performance metric does not satisfy the performance threshold 524. An example of a performance metric is RMSE. Although RMSE may be discussed in the present disclosure, it should be understood that other performance metrics may be used.

If the performance metric (e.g., RMSE) satisfies the performance threshold 524 (e.g., the RMSE is greater than or equal to the performance threshold 524), the ensemble system health check 520 may trigger a retraining of the LSTM models 504 based on fresh data (e.g., dataset 506) to improve their performance and re-evaluate the performance. For example, if the ensemble system health check 520 detects performance degradation with an LSTM model 504, the ensemble system health check 520 may access the recent dataset 506, retrain the LSTM models 504, and update the LSTM models 504 in accordance with the retrained LSTM models. For example, the ensemble system health check 520 may replace at least one of the LSTM models 504 with at least one of the retrained LSTM models. If the ensemble system health check 520 detects that the accuracy has dropped below the performance threshold 524 (e.g., the RMSE is greater than or equal to the performance threshold 524), then the ensemble system health check 520 may continue to trigger the retraining of the LSTM models 504 until the accuracy reaches at least the performance threshold 524. After a maximum number of re-trainings have been consecutively retriggered, the ensemble system health check 520 may notify a QoS system administrator that the number of re-trainings has reached the maximum number and that manual intervention is suggested.

If the RMSE does not satisfy the performance threshold 524 (e.g., the RMSE is less than the performance threshold 524), the health check passes and the ensemble system health check 520 may determine that the LSTM models 504 are accurate enough that the future time series module 522 may forecast the time series.

The future time series module 522 may perform a future time series operation on the inputs and provide the predicted IOPS 536 and the predicted ssLoad 538 to the optimization module 232. In some examples, the future time series module 522 may initialize ensembles of LSTM models 504 in parallel and from the initialized ensemble of LSTM models 504, select a target IOPS ensemble 530 and an ssLoad ensemble 532. The target IOPS ensemble 530 may include an ensemble of LSTM models 504 that are trained on target IOPS, and the ssLoad ensemble 532 may include an ensemble of LSTM models 504 that are trained for ssLoads.

The future time series module 522 may select the most relevant neural networks from the target IOPS ensemble 530 and from the ssLoad ensemble 532 that match the one or more workload characteristics (e.g., based on utilization workloads and/or application workload type(s)) and accordingly create a subset of ensembles 534 based on the one or more matched workload characteristics. The subset of ensembles 534 is a subset of the target IOPS ensemble 530 and the ssLoad ensemble 532. In some examples, if a volume has been tagged as being an application workload of a first type and/or a second type, the future time series module 522 may select the neural networks that have been trained for the application workload of the first type and/or the second type. Additionally, each neural network in the target IOPS ensemble 530 and in the ssLoad ensemble 532 may be trained for different utilization workloads such as low utilization, high utilization, bursty workloads, etc. For example, if a measured IOPS metric 422 of the volume 208*i* indicates that the utilization workload of the application workload processed by the volume 208*i* for the client 214, the future time series module 522 may select an ensemble for the subset of ensembles 534 that has a matching utilization workload.

The future time series module 522 may take as input the set of measured IOPS metrics 422 and the ssLoad 424. The set of measured IOPS metrics 422 provides the future time series module 522 with time series data of the volume 208*i* for the client 214. Using the set of measured IOPS metrics 422 for the volume 208*i* and each network in the subset of ensembles 534 trained on target IOPS, the future time series module 522 may determine an average of the measured IOPS metric. The average of the measured IOPS metric may be the predicted IOPS 536. Using the ssLoad 424 and each network in the subset of ensembles 534 trained on ssLoad, the future time series module 522 may determine an average ssLoad. The average ssLoad may be the predicted ssLoad 538. Accordingly, the future time series module 522 may determine, based on the input and the subset of ensembles 534, the predicted IOPS 536 and the predicted ssLoad 538.

Additionally, the future time series module 522 may transmit the predicted IOPS 536 and the predicted ssLoad 538 to the optimization module 232. In an example, the future time series module 522 stores the predicted IOPS 536 and the predicted ssLoad 538 into an array provided by the array module 436 in FIG. 4 and transmits the array to the optimization module 232. In this example, the future time series module 522 may append the predicted IOPS 536 and the predicted ssLoad 538 to an end of the array such that the optimization module 232 receives a data in a particular order.

Figure 6:
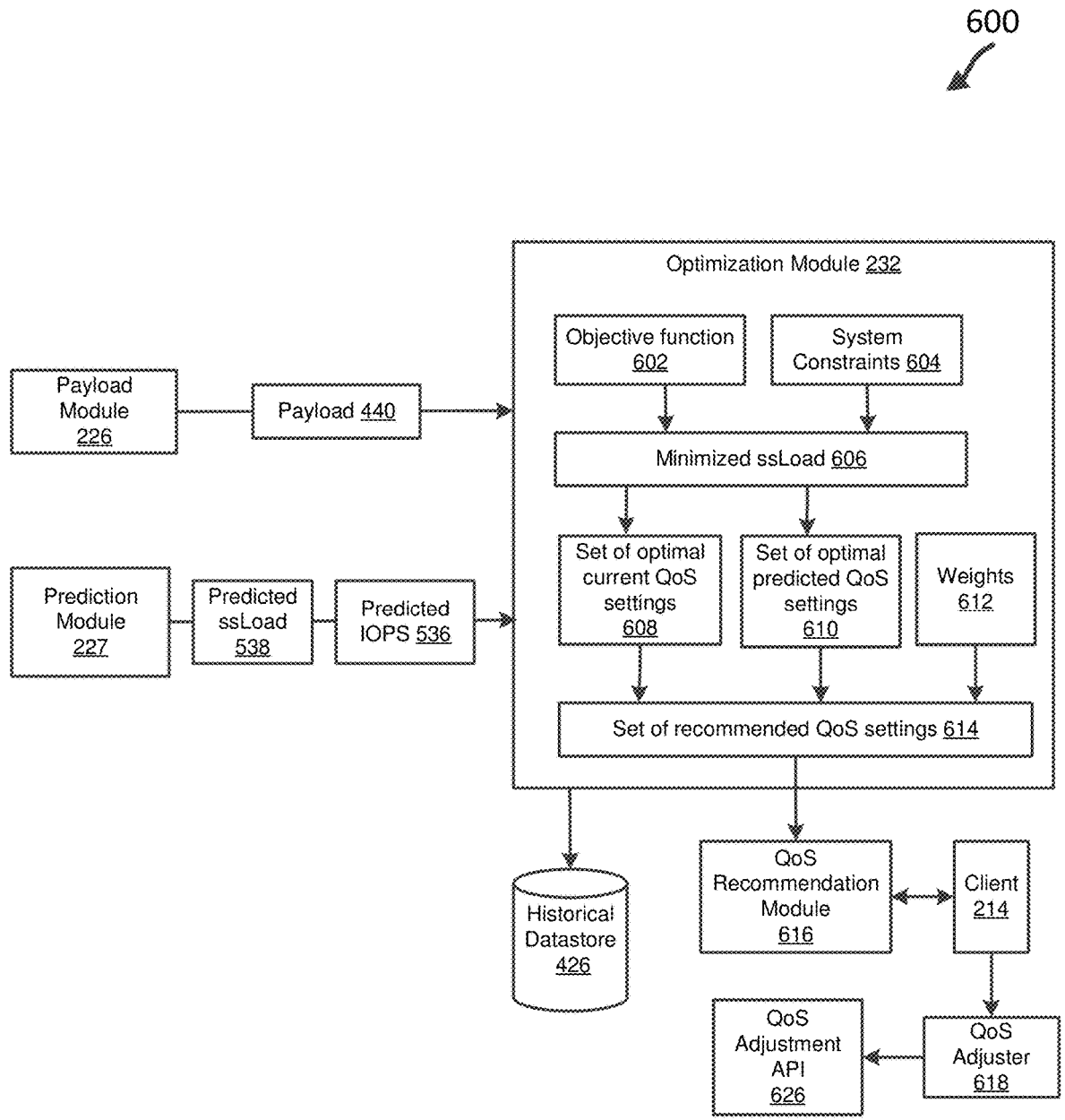
FIG. 6 is a schematic diagram of an optimization module providing a set of recommended QoS settings for a volume in accordance with one or more aspects of the present disclosure.

FIG. 6 is a schematic diagram 600 of the optimization module 232 (FIGS. 2, 4, 5) providing a set of recommended QoS settings 614 for a volume in accordance with one or more aspects of the present disclosure. As illustrated in FIG. 6, the optimization module 232 may receive the payload 440 from the payload module 226 and may receive the predicted targeted IOPS 536, and the predicted ssLoad 538 from the prediction module 227. The set of recommended QoS settings 614 may be based on the inputs (e.g., the payload 440, predicted targeted IOPS 536, and the predicted ssLoad 538) and include an optimal minimum IOPS value, an optimal maximum IOPS value, and/or an optimal burst IOPS value of the volume $208_1$ for the client 214.

The optimization module 232 may set up an optimization context by determining an objective function 602 and system constraints 604. An objective function may refer to a function that is to be minimized or maximized in an optimization problem. The piecewise ssLoad function discussed in the present disclosure is an example of an objective function. A goal of the objective function may include minimizing the ssLoad function with respect to the various QoS settings across all the volumes in the cluster.

The objective function 602 may provide a function of ssLoad and indicate a model of the data in function form, where the data can be minimized or maximized. The data model may represent the historical data and the predicted state of both the IOPS and the ssLoad (e.g., predicted IOPS 536, predicted ssLoad 538). The historical data may include the most recent data. A goal of the objective function 602 is to minimize the piecewise ssLoad with respect to the client 214's current minimum IOPS value setting and the maximum IOPS value setting for the volume $208_1$. In some examples, the optimization module 232 optimizes the QoS settings by minimizing the ssLoad objective function.

The system constraints 604 may limit the domain of the objective function 602 to reduce the amount of time the optimization module 232 takes to determine the set of recommended QoS settings 614. By restricting the domain by the system constraints 604, the optimization module 232 may arrive at the set of recommended QoS settings 614 without minimizing or maximizing any of the IOPS values by an infinite space. Each node on which a volume resides may be rated for a maximum amount of I/O that the node is allowed to satisfy. An example of system constraints 604 regarding the volume $208_1$ may specify that a sum of the client's minimum IOPS value assigned to the volume shall be less than or equal to (e.g., not greater than) the maximum I/O rating for a node on which the volume $208_1$ resides, the client's minimum IOPS value assigned to the volume $208_1$ shall be greater than or equal to (e.g., not less than) 50 IOPS, and/or the client's maximum IOPS value assigned to the volume $208_1$ shall be less than or equal to (e.g., not greater than) the maximum I/O rating for the volume.

If the client's maximum IOPS value setting of a volume is set at 500 IOPS and the target IOPS of the volume is 1000 IOPS, the client's maximum IOPS value setting is not set high enough for the volume to continue to process the number of target IOPS without throttling. In this example, the ssLoad is high (e.g., 60). A user may adjust the client's maximum IOPS value setting to minimize the ssLoad while the being above the target IOPS. As discussed above in relation to FIG. 3, throttling may start to occur when the ssLoad reaches 38 and above. Accordingly, it may be desirable to minimize the ssLoad to a value that is below 38 to avoid throttling. The optimization module 232 may determine, based on the objective function 602 and the system constraints 604, a minimized ssLoad 606.

The optimization module 232 may determine, based on the minimized ssLoad 606, a set of optimal current QoS settings 608, a set of optimal predicted QoS settings 610, and/or weights 612 for applying to the set of optimal current QoS settings 608 and the set of optimal predicted QoS settings 610. The set of optimal current QoS settings 608 may include an optimal current minimum IOPS value of the volume, an optimal current maximum IOPS value of the volume, and/or an optimal current burst IOPS value of the volume identified by the volume ID 412. The set of optimal predicted QoS settings 610 may include an optimal future minimum IOPS value of the volume, an optimal future maximum IOPS value of the volume, and/or an optimal future burst IOPS value of the volume identified by the volume ID 412. The weights 612 may include a set of weights assigned to the set of optimal current QoS settings 608 and a set of weights assigned to the set of optimal predicted QoS settings 610. The set of optimal current QoS settings 608 may be more important to determining the set of recommended QoS settings 614 than the set of optimal predicted QoS settings 610. Accordingly, the set of weights assigned to the set of optimal current QoS settings 608 may be greater than the set of weights assigned to the set of optimal predicted QoS settings 610. In some examples, the set of weights assigned to the set of optimal current QoS settings 608 is one, and the set of weights assigned to the set of optimal predicted QoS settings 610 is one.

The optimization module 232 may determine, based on the set of optimal current QoS settings 608, the set of optimal predicted QoS settings 610, and/or the weights 612, a set of recommended QoS settings 614. The set of recommended QoS settings 614 may be based on an average of the weighted set of optimal current QoS settings 608 and the weighted set of optimal predicted QoS settings 610.

Additionally, the optimization module 232 may store the set of recommended QoS settings 614 in, for example, the historical datastore 426. The data stored in the historical datastore 426 may be retrieved to analyze a client's QoS previous, current, and recommend QoS settings along with the client's volume usage.

The optimization module 232 may transmit the set of recommended QoS settings 614 to a QoS recommendation module 616. The QoS recommendation module 616 may receive and transmit the set of recommended QoS settings 614 to the client 214 as a QoS settings recommendation for the volume $208_1$. The client 214 may receive the set of recommended QoS settings 614 and determine whether to update the client 214's QoS parameter settings with the set of recommended QoS settings 614. If the client 214 determines to update the client 214's QoS settings with the set of recommended QoS settings 614, the client 214 may transmit a request to a QoS adjuster 618 to adjust the client 214's QoS settings in accordance with the set of recommended QoS settings 614. The QoS adjuster may invoke a QoS adjustment API 626 that adjusts the client 214's QoS settings. If invoked, the QoS adjustment API 626 causes the client 214's QoS settings to be updated with the set of recommended QoS settings 614. For example, the client 214's minimum IOPS setting 414 would be the minimum IOPS setting specified in the set of recommended QoS settings 614, the client 214's maximum IOPS setting 416 would be the maximum IOPS setting specified in the set of recommended QoS settings 614, and/or the client 214's burst IOPS setting 418 would be the burst IOPS setting specified in the set of recommended QoS settings 614. Accordingly, if the data ingest module 222 were to invoke the volume QoS settings API 402 (shown in FIG. 4), the volume QoS settings API 402 may transmit the QoS information 410 including the set of recommended QoS settings 614.

The client may decide whether to replace the client's current QoS settings with the set of recommended QoS settings, while in other examples the slice service(s) may automatically adopt the recommended QoS settings from the QoS module. A user may opt into providing information to the QoS module and/or allowing their QoS settings to be automatically adjusted based on the recommended QoS settings.

In some examples, the storage OS 210 provide the set of recommended QoS settings on an opt-in basis. For example, clients may elect to provide the client's QoS settings and volume usage information (e.g., measured IOPS metric) to request assistance in monitoring and managing their QoS settings. In this example, if a client does not opt into this program, the QoS module 220 does not provide the client with a set of recommended QoS settings.

The QoS module 220 in FIG. 2 may iterate through each cluster, storage node, slice service, and volume of the distributed storage system 104 and determine a set of recommended QoS settings 614 for each of the volumes.

Figure 7:
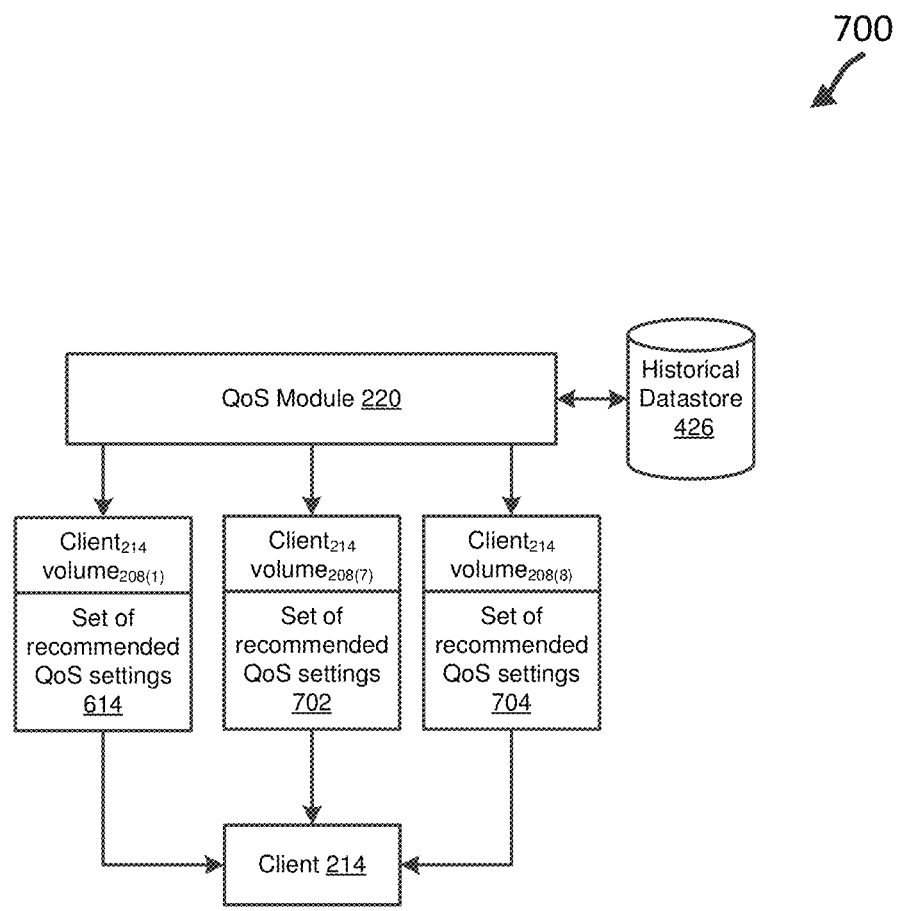
FIG. 7 is a schematic diagram of the QoS module providing a client with a set of recommended QoS settings for a plurality of volumes accessed by the client according to one or more aspects of the present disclosure.

FIG. 7 is a schematic diagram 700 of the QoS module 220 (FIG. 2) providing the client 214 with a set of recommended QoS settings for a plurality of volumes accessed by the client 214 according to one or more aspects of the present disclosure. In the example illustrated in FIG. 7, the client 214 may store, retrieve, modify, and/or move data stored with the volume $208_1$ residing on the slice service $206_1$ and the volumes $208_7$ and $208_8$ residing on the slice service $206_4$. As discussed in relation to FIGS. 2-6, the QoS module 220 may provide the client 214 with the set of recommended QoS settings 614 for the volume $208_1$. Additionally, using the techniques discussed in the present disclosure, the QoS module 220 may provide the client 214 with a set of recommended QoS settings 702 for the volume $208_7$ and may provide the client 214 with a set of recommended QoS settings 704 for the volume $208_8$.

If the client 214 transmits a request to the QoS adjuster 618 to change the QoS settings of a particular volume, the QoS adjuster 618 may determine whether the slice service on which the particular volume resides includes other volumes. If so, the QoS adjuster 618 may transmit to the client 214, a message indicating that the slice service on which the particular volume resides includes other volumes and that the QoS adjuster 618 recommends adjusting the QoS settings for each of the volumes residing on the slice service. The QoS module 220 may collect the data and store the data (e.g., the set of recommended QoS settings for the volumes) into the historical datastore 426. The QoS module 220 may analyze the data stored at the historical datastore 426 at a later point in time.

Figure 8:
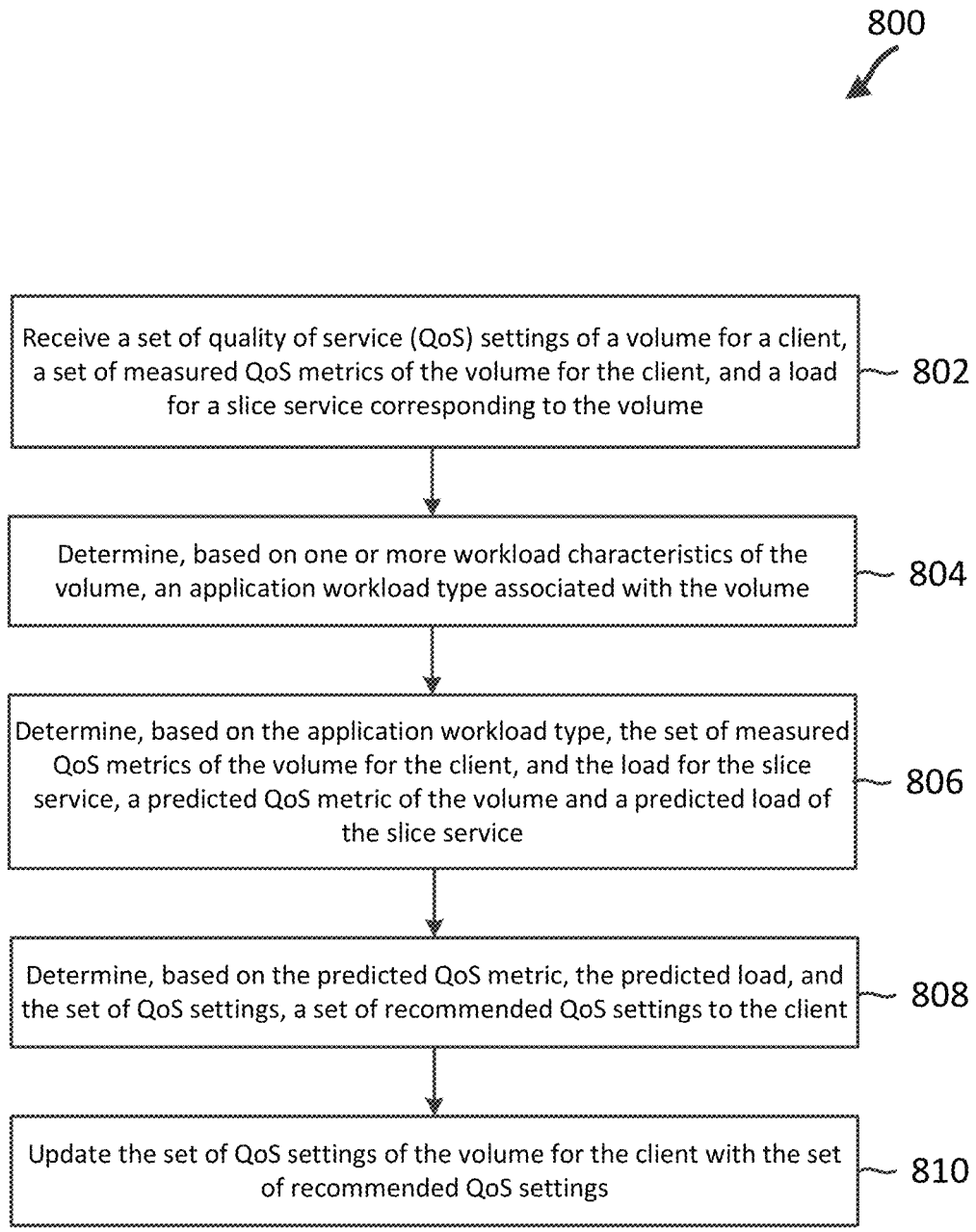
FIG. 8 is a flow diagram of a method of providing a set of recommended QoS settings according to one or more aspects of the present disclosure.

FIG. 8 is a flow diagram of a method 800 of providing a set of recommended QoS settings according to one or more aspects of the present disclosure. Blocks of the method 800 can be executed by a computing device (e.g., a processor, processing circuit, and/or other suitable component, such as of a storage node 106). For example, the QoS module 220 may utilize one or more components, such as the data ingest module 222, the preprocessing module 224, the prediction module 227, and/or the optimization module 232, to execute the blocks of method 800. As illustrated, the method 800 includes a number of enumerated blocks, but embodiments of the method 800 may include additional blocks before, after, and in between the enumerated blocks. In some embodiments, one or more of the enumerated blocks may be omitted or performed in a different order.

At block 802, the method 800 includes receiving a set of QoS settings of a volume for a client, a set of measured QoS metrics of the volume for the client, and a measure of load for a slice service corresponding to the volume. A "measure of load" and a "load" may be used interchangeably in the present disclosure. The set of QoS settings may include at least one of a minimum IOPS value assigned to the volume, a maximum IOPS value assigned to the volume, and/or a burst IOPS value assigned to the volume. The set of measured QoS metrics may include IOPS. The load may include an ssLoad.

At block 804, the method 800 includes determining, based on one or more workload characteristics of the volume, an application workload type associated with the volume. In some examples, determining the application workload type includes performing K-means clustering (e.g., time series shape characteristic matching through K-means clustering) or other unsupervised learning function or unsupervised learning algorithm to identify curve shapes of time series associated with workloads processed on the volume and a set of shapes of time series associated with the one or more application workload types.

At block 806, the method 800 includes determining, based on the application workload type, the set of measured QoS metrics of the volume for the client, and the load for the slice service, a predicted QoS metric of the volume and a predicted load of the slice service. The QoS module 220 may tag the volume based on the application workload type.

At block 808, the method 800 includes determining, based on the predicted QoS metric, the predicted load, and set of QoS settings, a set of recommended QoS settings to the client. The time period for the predicted load may vary from node to node and cluster to cluster depending on the workloads that are identified and the patterns of their IOPS over time. For example, the predicted load may refer to a load that is predicted for a future time period (e.g., 500 milliseconds, 5 seconds, etc.). At block 810, the method 800 includes updating the set of QoS settings of the volume for the client with the set of recommended QoS settings.

In some examples, the QoS module 220 may determine, based on the set of measured QoS metrics and a set of trained neural networks associated with one or more workload characteristics, the predicted QoS metric of the volume. In some examples, the load may be an ssLoad. Additionally or alternatively, the QoS module 220 may determine, based on the load (e.g., ssLoad) for the slice service and a set of trained neural networks associated with the one or more workload characteristics, the predicted load (e.g., ssLoad) of the slice service. The QoS module 220 may receive a request from the client to update the set of QoS settings of the volume for the client with the set of recommended QoS settings. The QoS module 220 may apply a set of weights to a set of optimal current QoS settings, where the set of recommended QoS settings includes the set of optimal current QoS settings after applying the set of weights to the set of optimal current QoS settings. Additionally or alternatively, the QoS module 220 may apply a set of weights to a set of optimal predicted QoS settings, where the set of recommended QoS settings includes the set of optimal predicted QoS settings after applying the set of weights to the set of optimal predicted QoS settings.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Thus, the present disclosure provides a system, method, and machine-readable storage medium for providing a set of recommended QoS settings in a distributed storage system. In some embodiments, the method includes receiving a set of quality of service (QoS) settings of a volume for a client, a set of measured QoS metrics of the volume for the client, and a load for a slice service corresponding to the volume; determining, based on one or more workload characteristics of the volume, an application workload type associated with the volume; determining, based on the application workload type, the set of measured QoS metrics of the volume for the client, and the load for the slice service, a predicted QoS metric of the volume and a predicted load of the slice service; determining, based on the predicted QoS metric, the predicted load, and the set of QoS settings, a set of recommended QoS settings to the client; and updating the set of QoS settings of the volume for the client with the set of recommended QoS settings.

In yet further embodiments, the non-transitory machine-readable medium has instructions for performing the method of providing a set of recommended QoS settings, including machine executable code, which when executed by at least one machine, causes the machine to: receive a set of QoS settings of a volume for a client, a set of measured QoS metrics of the volume for the client, and a load for a slice service corresponding to the volume; determine, based on the load for the slice service and a first set of neural networks trained for the load, a predicted load; determine, based on the set of measured QoS metrics of the volume and a second set of neural networks trained for a target QoS metric, a predicted QoS metric of the volume; determine, based on the predicted QoS metric, the predicted load, and the set of QoS settings, a set of recommended QoS settings to the client; and update the set of QoS settings of the volume for the client with the set of recommended QoS settings.

In some examples, the load may be an ssLoad. In some examples, the set of QoS settings includes at least one of a minimum IOPS value assigned to the volume, a maximum IOPS value assigned to the volume, or a burst IOPS value assigned to the volume. In some examples, the non-transitory machine-readable medium, further including code, which causes the machine to determine an application workload type associated with the volume by performing time series shape characteristic matching through an unsupervised learning function or unsupervised learning algorithm (e.g., K-means clustering, etc.) to identify curve shapes of time series associated with a workload processed on the volume and a set of shapes of time series associated with the application workload type. In some examples, the non-transitory machine-readable medium, further including code, which causes the machine to determine, based on one or more workload characteristics of the volume, an application workload type associated with the volume, where the predicted QoS metric of the volume and the predicted load of the slice service is based on the application workload type.

In some examples, the non-transitory machine-readable medium, further including code, which causes the machine to determine, based on one or more workload characteristics of a volume for a client, an application workload type associated with the volume, wherein the volume is assigned a set of QoS settings for a client, the volume is associated with a set of measured QoS metrics for the client, and a slice service corresponding to the volume has a load; determine, based on the application workload type, the set of measured QoS metrics of the volume for the client, and the load for the slice service, a predicted QoS metric of the volume and a predicted load of the slice service; determine, based on the predicted QoS metric, the predicted load, and the set of QoS settings, a set of recommended QoS settings to the client; and update the set of QoS settings of the volume for the client with the set of recommended QoS settings.

In yet further embodiments, a computing device includes a memory containing a machine-readable medium comprising machine executable code having stored thereon instructions for performing a method of providing a set of recommended quality of service (QoS) settings and a processor coupled to the memory. The processor is configured to execute the machine executable code to: determine, based on one or more workload characteristics of a volume for a client, an application workload type associated with the volume, wherein the volume is assigned a set of QoS settings for a client, the volume is associated with a set of measured QoS metrics for the client, and a slice service corresponding to the volume has a load; determine, based on the application workload type, the set of measured QoS metrics of the volume for the client, and the load for the slice service, a predicted QoS metric of the volume and a predicted load of the slice service; determine, based on the predicted QoS metric, the predicted load, and the set of QoS settings, a set of recommended QoS settings to the client; and update the set of QoS settings of the volume for the client with the set of recommended QoS settings.

In some examples, the load is an ssLoad. In some examples, the set of QoS settings includes at least one of a minimum IOPS value assigned to the volume, a maximum IOPS value assigned to the volume, or a burst IOPS value assigned to the volume. In some examples, the set of measured QoS metrics includes IOPS. In some examples, the processor is configured to execute the machine executable code to invoke a set of APIs to receive the set of QoS settings of the volume for the client, the set of measured QoS metrics of the volume for the client, and the load.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving a set of quality of service (QoS) settings of a volume for a client, a set of measured QoS metrics including a set of input/output operations per second (IOPS) metrics of the volume for the client, the set of IOPS metrics including time series data that is in sequence and timestamped, and a load for a slice service corresponding to the volume, wherein the slice service is included within a storage node and includes one or more volumes including the volume;
   determining, based on one or more workload characteristics of the volume, an application workload type associated with the volume;
   determining both a predicted QoS metric and a predicted load of the slice service,
      wherein the predicted QoS metric is determined based on the application workload type and the set of measured QoS metrics of the volume, the predicted QoS metric comprising a predicted IOPS of the volume, and
      wherein the predicted load of the slice service is determined based on the application workload type, the set of measured QoS metrics of the volume, and the load for the slice service;
   determining, based on the predicted QoS metric, the predicted load, and the set of QoS settings, a set of recommended QoS settings to the client; and
   updating the set of QoS settings of the volume for the client with the set of recommended QoS settings.

2. The method of claim 1, wherein the set of QoS settings includes at least one of a minimum IOPS value assigned to the volume, a maximum IOPS value assigned to the volume, or a burst IOPS value assigned to the volume.

3. The method of claim 1, wherein the volume comprises a set of data structures in which a first portion of the set of data structures stores data for the volume and a second portion of the set of data structures describe the data of the volume.

4. The method of claim 1, wherein determining the application workload type includes performing time series shape characteristic matching through an unsupervised learning function to identify curve shapes of time series associated with workloads processed on the volume and a set of shapes of time series associated with one or more application workload types.

5. The method of claim 1, further comprising:
tagging the volume based on the application workload type.

6. The method of claim 1, wherein the determining comprises:
selecting a subset of trained neural networks from a plurality of target IOPS neural networks based on the application workload type and a utilization workload determined using the set of IOPS metrics; and
determining, based on the set of IOPS metrics and the subset of trained neural networks, the predicted IOPS of the volume, wherein the predicted IOPS is a number of target IOPS that the volume is predicted to have within a future time period.

7. The method of claim 1, wherein the determining comprises:
selecting a subset of trained neural networks from a plurality of slice service load neural networks based on the application workload type and a utilization workload determined using the set of IOPS metrics; and
determining, based on the load for the slice service and the subset of trained neural networks, the predicted load of the slice service, wherein the predicted load of the slice service is a load value that the slice service is predicted to have within a future time period.

8. The method of claim 1, further comprising:
receiving a request from the client to update the set of QoS settings of the volume for the client with the set of recommended QoS settings.

9. The method of claim 1, further comprising:
applying a set of weights to a set of optimal current QoS settings, the set of recommended QoS settings including the set of optimal current QoS settings after the applying the set of weights.

10. The method of claim 1, further comprising:
applying a set of weights to a set of optimal predicted QoS settings, the set of recommended QoS settings including the set of optimal predicted QoS settings after the applying the set of weights.

11. A non-transitory machine-readable medium containing instructions that, when executed by a machine, cause the machine to:
receive a set of quality of service (QoS) settings of a volume for a client, a set of measured QoS metrics including a set of input/output operations per second (IOPS) metrics of the volume for the client, the set of IOPS metrics including time series data that is in sequence and timestamped, and a load for a slice service corresponding to the volume, wherein the slice service is included within a storage node and includes one or more volumes including the volume;
select, from a plurality of slice service load neural networks trained for the load, a first set of neural networks based on an application workload type for the volume and a utilization workload determined using the set of measured QoS metrics;
determine, based on the load for the slice service and the first set of neural networks trained for the load, a predicted load for the slice service;
select, from a plurality of target IOPS neural networks trained for a target IOPS, a second set of neural networks based on the application workload type for the volume and the utilization workload;
determine, based on the set of measured QoS metrics of the volume and the second set of neural networks, a predicted IOPS of the volume;
determine, based on the predicted IOPS, the predicted load, and the set of QoS settings, a set of recommended QoS settings to the client; and
update the set of QoS settings of the volume for the client with the set of recommended QoS settings.

12. The non-transitory machine-readable medium of claim 11, wherein the set of QoS settings includes at least one of a minimum IOPS value assigned to the volume, a maximum IOPS value assigned to the volume, or a burst IOPS value assigned to the volume.

13. The non-transitory machine-readable medium of claim 11, further comprising code, which causes the machine to:
determine the application workload type associated with the volume by performing time series shape characteristic matching through an unsupervised learning function to identify curve shapes of time series associated with a workload processed on the volume and a set of shapes of time series associated with the application workload type.

14. The non-transitory machine-readable medium of claim 11, further comprising code, which causes the machine to:
determine, based on one or more workload characteristics of the volume, the application workload type associated with the volume.

15. The non-transitory machine-readable medium of claim 11, further comprising code, which causes the machine to:
determine, based on a minimized load that is not greater than the load, a set of optimal current QoS settings and a set of optimal predicted QoS settings, wherein the set of recommended QoS settings includes a weighted set of optimal current QoS settings and a weighted set of optimal predicted QoS settings.

16. The non-transitory machine-readable medium of claim 11, further comprising code, which causes the machine to:
transform at least one of the set of QoS settings of the volume for the client or the set of measured QoS metrics of the volume for the client into a set of normalized values for determining the predicted IOPS QoS metric and the predicted load.

17. A computing device comprising:
a memory containing a non-transitory machine-readable medium comprising machine executable code having stored thereon instructions for performing a method of updating a set of QoS settings of a volume; and
a processor coupled to the memory, the processor configured to execute the machine executable code to:
determine, based on one or more workload characteristics of the volume for a client, an application workload type associated with the volume, wherein the volume is assigned a set of quality of service (QoS) settings for the client, the volume is associated with a set of measured QoS metrics including a set of input/output operations per second (IOPS) metrics for the client, the set of IOPS metrics including time series data that is in sequence and timestamped, and a slice service corresponding to the volume has a load, wherein the slice service is included within a storage node and includes one or more volumes including the volume;

determine both a predicted QoS metric of the volume and a predicted load of the slice service,
- wherein the predicted QoS metric is determined based on the application workload type and the set of measured QoS metrics of the volume, the predicted QoS metric comprising a predicted IOPS of the volume, and
- wherein the predicted load of the slice service is determined based on the application workload type, the set of measured QoS metrics of the volume, and the load for the slice service;

determine, based on the predicted QoS metric, the predicted load, and the set of QoS settings, a set of recommended QoS settings to the client; and update the set of QoS settings of the volume for the client with the set of recommended QoS settings.

18. The computing device of claim 17, wherein the set of QoS settings includes at least one of a minimum input/output operations per second (IOPS) value assigned to the volume, a maximum IOPS value assigned to the volume, or a burst IOPS value assigned to the volume.

19. The computing device of claim 17, wherein the processor is configured to execute the machine executable code to:

invoke a set of application programming interfaces (APIs) to receive the set of QoS settings of the volume for the client, the set of measured QoS metrics of the volume for the client, and the load.

* * * * *